United States Patent [19]

Watson et al.

[11] Patent Number: 4,975,267

[45] Date of Patent: Dec. 4, 1990

[54] STABLE $K_2Fe_{22}O_{34}$ POTASSIUM FERRITE PHASE AND METHOD OF MANUFACTURE

[75] Inventors: James M. Watson, Monroe, La.; David Crabbe; Thomas S. Coursen, Jr., both of St. Louis, Mo.

[73] Assignee: Columbian Chemicals Co., Cobb County, Ga.

[21] Appl. No.: 66,232

[22] Filed: Jun. 25, 1987

[51] Int. Cl.$^5$ .............................................. C01G 49/02
[52] U.S. Cl. .................................... 423/594; 423/641; 502/338; 502/344; 252/62.56; 252/62.6
[58] Field of Search ................ 423/594, 641; 502/338, 502/344; 252/62.56, 62.6

[56] References Cited

U.S. PATENT DOCUMENTS

| | | | |
|---|---|---|---|
| 2,835,553 | 5/1958 | Harrison | 423/594 |
| 3,123,486 | 3/1964 | Johnson | 423/594 |
| 4,545,974 | 10/1985 | Thompson | 423/594 |

FOREIGN PATENT DOCUMENTS

| | | | |
|---|---|---|---|
| 0059622 | 9/1982 | European Pat. Off. | 423/594 |
| 1100905 | 5/1986 | Japan | 423/594 |

OTHER PUBLICATIONS

Mellor, J. W., *A Comprehensive Treatise On Inorganic and Theoretical Chemistry*, vol. XIII, 1934, pp. 906–908.

Primary Examiner—Robert L. Stoll
Attorney, Agent, or Firm—Head and Johnson

[57] ABSTRACT

Stable $K_2Fe_{22}O_{34}$ in the form of lamellar platelets useful as a dehydrogenation catalyst and a method of manufacturing the same, including the steps of mixing iron oxide and a potassium compound, such as potassium carbonate, preferably in a molar ratio of Fe to K of from 3 to 6 and calcining the mixture at a temperature of at least about 900° C. for at least 15 minutes.

9 Claims, 1 Drawing Sheet

STABLE $K_2Fe_{22}O_{34}$ POTASSIUM FERRITE PHASE AND METHOD OF MANUFACTURE

SUMMARY OF THE INVENTION

The ideal styrene catalyst should offer high-selectively (95+Mol. %) to styrene at a high activity (able to achieve a target single pass conversion of 65–70%) at a minimum temperature (<1150° F.), and should give stable activity at a low ($\leqq$8:1) molar steam to hydrocarbon (S/H) ratio over a run duration of 18–24 mos. To do this, it must be both chemically (minimal potassium migration) and physically (shrinkage, attrition)stable. A catalyst capable of simultaneously fulfilling all of these requirements does not currently exist commercially.

For purposes of illustration, two very real cases can be considered to represent the dilemma of a buyer of styrene catalyst: A. Buy a high activity, durable catalyst capable of stable operation at low S/H and sacrifice selectivity; or B. Purchase a high selectivity catalyst requiring increased S/H for stable operation, and having low activity (requires increased temperature) with the understanding that run duration will probably be shortened by chemical and/or physical deterioration.

Major commercial catalyst vendors can supply a highly selective catalyst but not for use at low S/H ratios or with adequate activity. Further, some catalyst products have a longstanding and continuing reputation for poor physical and chemical stability which leads to bed fusion, shrinkage (causes bypassing in radial reactors), increased delta P, and generally premature deactivation which shortens run duration. In some instance it has been necessary to dynamite fused catalyst products from reactors.

The styrene catalysts available are principally comprised of iron and potassium oxides, sometimes, but not always, with additional lesser amounts of promoters. The function of the potassium is to promote the water gas reaction to prevent laydown of coke.

Incorporation of potassium into an iron oxide crystal structure provides a structure more stable than obtainable with a physical mixture. While presently used catalyst, as loaded into a styrene production facility, may well be converted to a ferrite in service, this leads to bed shrinkage which can be avoided by beginning with a ferrite. Such in situ conversion, in addition, likely adversely affects physical integrity. Also, the fusion problems evidenced by known catalysts are attributable to bloom of potassium into the interstitial spaces between particles and melt fusion thereof as either the carbonate or hydroxide; again, a phenomena to which a ferrite provides resistance.

Deactivation in styrene catalysts is at least partially attributable to a slow migration of the water gas promoter (K) downstream and a resultant increase in steady state coke level on the catalyst. This migration is believed to occur via intermediacy of the relatively volatile KOH which exists in equilibrium with $K_2CO_3$ in the dehydrogenation system. Incorporation of potassium into the iron oxide crystal structure should circumvent the carbonate-hydroxide equilibrium and thereby provide resistance to deactivation on steaming which sometimes is unavoidably associated with process upsets.

The use of potassium ferrite provides a combination of characteristics which has remained an unfulfilled dream of styrene producers. The high selectivity of the stable potassium ferrite as a catalyst provides less combustion and a lower partial pressure of $CO_2$ within the system. A stable potassium ferrite catalyst also provides increased resistance to the detrimental effect of lower $CO_2$ partial pressure that with simple oxides would result in an incremental shift of the $K_2O_3$-KOH equilibrium toward the more volatile component and increase the rate of potassium loss which, in turn, requires increased S/H to maintain a given steady state coke level on the catalyst surface and a consequent steady activity. Since potassium ferrite desensitizes the system to $CO_2$ partial pressure it unlocks the development of a high selectivity catalyst-stable to low S/H.

The prereacted iron and potassium oxides in ferrite form provide a mechanically stable catalyst bed free of shrinkage associated with conventional catalysts.

The present invention provides a catalyst which fulfills the requirements of an ideal catalyst for use in the manufacture of styrene. The catalytic material is $K_2Fe_{22}O_{34}$ in the form of lamellar platelets. This material is manufactured by thoroughly mixing iron oxide and a potassium compound, such as anhydrous potassium carbonate in a preferred molar ratio of Fe to K of 2 to 11, and more preferably of about 3 to 6, and calcining the mixture at a temperature of 900° C. or higher for at least 15 minutes.

A better understanding to the invention will be had by reference to the following specification and claims.

DESCRIPTION OF THE DRAWING

The drawing is an electron microscope photograph showing water extracted stable $K_2Fe_{22}O_{34}$ at a magnification of 10,000.

DESCRIPTION OF THE PREFERRED EMBODIMENT

Iron oxides are used along with potassium compounds for dehydrogenation catalysts in styrene production. The percentage of potassium compound ranges from 5–30% in the catalyst. The subject of this disclosure is based on the hypothesis that a prereacted iron-potassium compound, such as a novel potassium ferrite will provide a more stable form of potassium in the catalyst leading to greater stability and improvements in selectivity and S/H ratio. In addition, the prereacted potassium ferrite will be more resistant to shrinkage providing improved physical integrity of the catalyst.

In the preferred method of manufacturing $K_2Fe_{22}O_{34}$ of this disclosure, iron oxide is intimately mixed with a potassium compound such as potassium carbonate, in a Fe to K mole ratio of 2 to 11 and more preferably from 3 to 6. The mixture is then calcined in ambient atmosphere and at ambient pressure, as in a rotary kiln at a temperature of at least about 900° C. for at least about 15 minutes. The calcining step results in the formation of potassium ferrite in the form of lamellar platelets along with unreacted iron and/or potassium compounds as impurities.

The product of calcination is then preferably washed. Washing is preferably performed by slurring the potassium ferrite with water at 3–20% solids content (preferably 10%) at a temperature of 20° C.–75° C. (preferably ambient) using air sparging or mechanical agitation. At this stage a wet milling procedure could be advantageously employed to break up coarse agglomerates formed in calcining.

The washed material is then filtered, such as by rotary vacuum filtration, or plate and frame pressure filtration, with water wash and dried by conventional techniques, such as in a rotary kiln or continuous belt tunnel dryer.

The dried product after washing is a stable $K_2Fe_{22}O_{34}$ potassium ferrite having a morphology characterized by lamellar platelets, with diameters from about 0.5 to 5 microns and thickness from about 0.1 to 0.5 microns.

The experimental preparation of potassium ferrite was carried out by mixing iron oxide and potassium carbonate in various ratios as detailed below. The mixtures were then calcined at various temperatures. The calcined material was then treated in various ways, including water washing to remove soluble components. More specifically, mixtures of yellow iron oxide (geothite) and potassium carbonate with mole ratios Fe/K=1, 3, 6, and 11 were calcined at various temperatures, including 800° C., 900° C., and 1000° C.

While experimental work was limited to yellow iron oxide and potassium carbonate it would be apparent to those skilled in the art that other iron oxides, such as hematite and magnetite, or iron compounds could be readily substituted for the yellow iron oxide and that potassium compounds, such as potassium hydroxide and potassium sulfate could be substituted for the potassium carbonate.

Experimental products were characterized for chemical composition and for crystal structure by x-ray diffraction analysis. Morphological characteristics were determined by scanning electron microscopy.

A test was developed for presence of a stable potassium compound in the calcined product. This involved mixing the sample (10% by weight) in water and boiling the mixture for 15 minutes followed by filtration and drying of the product. The potassium content of the washed material was then determined by flame emission spectroscopy and the mole ratio of Fe:k determined. As most potassium compounds are water soluble, a low Fe:K mole ratio after water washing suggests the formation of a stable phase.

The following examples are for illustrative purposes only and are not intended to limit the invention in any way.

COMPARATIVE EXAMPLES 1-3

Samples were prepared using an Fe:K mole ratio of one (1) and calcined at varying temperature. The following table shows the composition of the products determined by x-ray diffraction and chemical analysis:

| No. | Temp °C. | % Hematite | % $K_2Fe_2O_4$ | % $K_2Fe_{22}O_{34}$ | Water Extracted Sample | |
|---|---|---|---|---|---|---|
| | | | | | Fe:k Mole Ratio | % $K_2Fe_{22}O_{34}$ |
| 1 | 800 | 32 | 62 | 6 | 18 | —* |
| 2 | 900 | 8 | 79 | 13 | 10 | 0 |
| 3 | 1,000 | 12 | 68 | 19 | 9 | 0 |

*Not determined

The major product under these conditions is a green potassium ferrite ($K_2Fe_2O_4$) which is unstable to water extraction. On exposure to atmosphere this material turns brown in color. Water extracted samples were amorphous.

Examples 1-3 were examined by SEM (scanning electron microscopy). Example 1 contained rounded and aggregated particles. Examples 2 and 3 showed similar rounded particles with increasing fusion of particles and increased particle size at higher temperatures.

EXAMPLES 4-6

These examples were carried out using a mole ratio of Fe:K of three (3). Results obtained were:

| No. | Temp °C. | % Hematite | % $K_2Fe_2O_4$ | % $K_2Fe_{22}O_{34}$ | Water Extracted Sample | |
|---|---|---|---|---|---|---|
| | | | | | Fe:k Mole Ratio | % $K_2Fe_{22}O_{34}$ |
| 4 | 800 | 81 | — | 19 | 26 | — |
| 5 | 900 | 77 | 5 | 17 | 18 | —* |
| 6 | 1,000 | — | — | 100 | 10 | 100 |

*Not determined

These examples clearly show the formation of the $K_2Fe_{22}O_{34}$ at higher reaction temperatures and the stability of this phase to water extraction.

At 800° C. (Example 4) and 900° C. (Example 5) SEM examination showed particles retained the elongated shape of the acicular yellow iron oxide feedstock with some rounding and fusing of particles. A small percentage of platelets were also present.

Material from Example 6 (1,000° C.) exhibited a majority of particles with platelet configuration with particle diameters of 0.5-5.0 microns and diameter of 0.1-0.5 microns.

EXAMPLES 7-9

These examples were performed as in Examples 4-6, except a mole ratio of Fe:K of 6:1 was employed. Results were:

| No. | Temp °C. | % Hematite | % $K_2Fe_2O_4$ | % $K_2Fe_{22}O_{34}$ | Water Extracted Sample | |
|---|---|---|---|---|---|---|
| | | | | | Fe:k Mole Ratio | % $K_2Fe_{22}O_{34}$ |
| 7 | 800 | 100 | 0 | 0 | 37 | —* |
| 8 | 900 | 42 | 0 | 57 | 38 | —* |
| 9 | 1,000 | 19 | 0 | 81 | 10.5 | 73 |

*Not determined

Example 7 contained rounded acicular particles typical of dehydrated yellow iron oxide. Example 8 contained a mixture of particle shapes. Example 9 contained well formed platelet type particles of similar sizes as those in Example 6. A photomicrograph of Example 9 after water washing is included.

EXAMPLE 10

Example 10 was prepared in a similar fashion to Example 4-6 using a mole ratio of Fe:K of 11, and a calcination temperature of 1,000° C.

X-ray diffraction showed this material contained 36% $K_2Fe_{22}O_{34}$ and 64% hematite after water extraction.

SEM examination showed the product to contain a mixture of the platelet particles found in Examples 6 and 9 and rounded acicular particles typical of hematite prepared from yellow iron oxide.

Examples 1-10 clearly demonstrate the range of compositions and temperatures required for formation of this lamellar shaped potassium ferrite $K_2Fe_{22}O_{34}$.

While it is expected that those skilled in the art could devise improvements in yield of $K_2Fe_{22}O_{34}$ at higher Fe:K ratios (6–11) the essential conditions for its formation have been defined.

Additional testing was performed on water extracted samples of Examples 6, 9 and 10.

Samples were subjected to a steam atmosphere for 24 hours at 650° C. and analyzed by scanning electron microscopy and x-ray diffraction.

The steam treated sample of Example 6 showed no change in particle morphology although a conversion of 52% of the $K_2Fe_{22}O_{34}$ to hematite was found.

The sample from Example 9 again showed no change in morphology and a reduction of $K_2Fe_{22}O_{34}$ content to 42% was observed.

The sample from Example 10 again showed no change in morphology and a reduction or in $K_2Fe_{22}O_{34}$ content as shown by x-ray diffraction.

The stability of particle morphology under these conditions indicates a good probability of stability under conditions of a catalytic reactor suggesting good integrity of the catalyst and reduced shrinkage of the catalyst.

The claims in the specification describe the invention presented and the terms that are employed in the claims draw their meaning from the use of such terms in the specification. The same terms employed in the prior may be broader in meaning than specifically employed herein. Whenever there is a question between the broader definition of such terms used in the prior art and the more specific use of the terms herein, the specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for preparing a composition consisting essentially of lamellar platelets of $K_2Fe_{22}O_{34}$ that are insoluble in water at temperatures in the range of 20 degrees C. to 75 degrees C. comprising:

(A) mixing iron oxide and a potassium compound selected from a group consisting of potassium carbonate, potassium hydroxide and potassium sulfate with the mole ratio of iron oxide to potassium compound being in the range of 3:1 to 6:1,
    (B) calcining the mixture from step (A) at a temperature of at least 900 degrees C. for at least fifteen minutes;
    (C) washing the product of step (B) with water to dissolve water soluble materials present in said product; and
    (D) separating the water containing water soluble materials from the insoluble components to obtain the $K_2F_{22}O_{34}$ composition.

2. A process according to claim 1 which produces a product in which the majority of the water insoluble particles are platelets having particle diameters in the range of 0.5 to 5 microns and thicknesses in the range of 0.1 to 0.5 microns.

3. The method of manufacturing $K_2Fe_{22}O_{34}$ according to claim 1 wherein the step of washing the products of step (B) is carried out at a temperature in the range of 20 degrees C. to 75 degrees C.

4. The method of manufacturing $K_2Fe_{22}O_{34}$ according to claim 1 wherein the step (A) the potassium compound is potassium carbonate.

5. The method of manufacturing $K_2Fe_{22}O_{34}$ according to claim 1 wherein the product obtained after washing is about 3 to 5% potassium.

6. The method of manufacturing $K_2Fe_{22}O_{34}$ according to claim 1 wherein in step (A) the iron oxide is yellow iron oxide and the potassium compound is potassium carbonate.

7. The method of manufacturing $K_2Fe_{22}O_{34}$ according to claim 1 wherein the step of washing the products of step (B) is carried out in a slurry at 3% to 20% solids content.

8. The method of manufacturing $K_2Fe_{22}O_{34}$ according to claim 7 wherein the step of washing the products of step (B) is carried out at a temperature of 20° C. to 75° C.

9. The method of manufacturing $K_2Fe_{22}O_{34}$ according to claim 1 wherein the iron oxide is selected from the group comprising yellow iron oxide, hemstite and magnetite.

* * * * *